Figure 1:
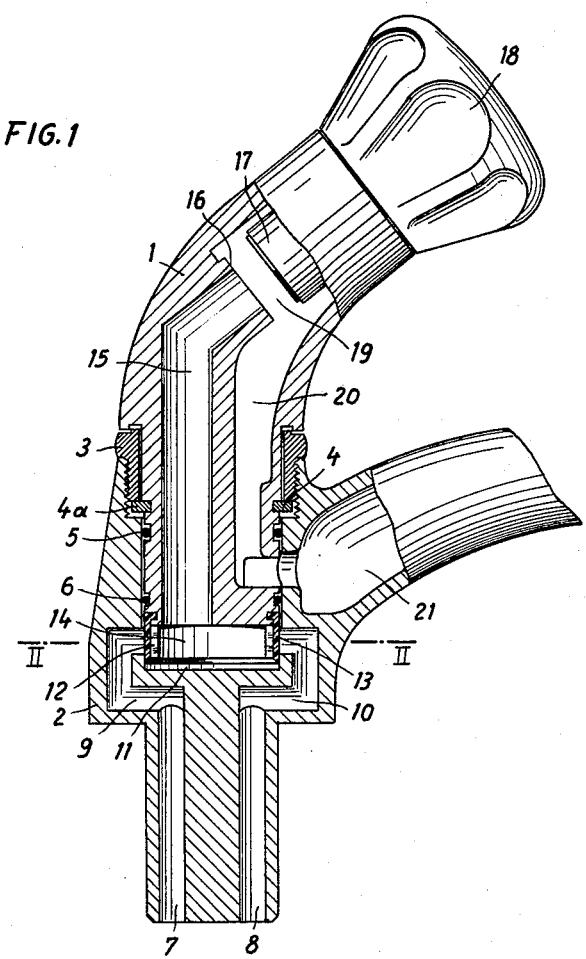

Nov. 30, 1965 F. MULLERS 3,220,436
MIXING VALVE WITH FLEXIBLE SLEEVE CONTROL
Filed March 18, 1963

United States Patent Office 3,220,436
Patented Nov. 30, 1965

3,220,436
MIXING VALVE WITH FLEXIBLE SLEEVE
CONTROL
Fritz Mullers, Breyell, Germany, assignor to Rokal
G.m.b.H., Lobberich, Germany, a firm
Filed Mar. 18, 1963, Ser. No. 265,637
Claims priority, application Germany, Dec. 12, 1962,
R 34,051
2 Claims. (Cl. 137—625.41)

The invention relates to a water tap with only one handle for delivering hot water, cold water or a mixture of hot and cold water, particularly for use in connection with baths, wash basins, sinks and the like, with an inlet for hot water and an inlet for cold water, a slide valve adjustable by turning for simultaneously admitting both hot and cold water, for admitting only hot water or only cold water and a shut-off element closing the passage through the tap by axial displacement, independenly of the slide valve.

Such taps are known in various constructions, in which the hot water inlet and the cold water inlet lead into the tap housing in the same direction side by side, the point of admission forming a flat valve seat common to both inlets, which seat is covered by a flat slide valve formed on the end of the handle shank extending into the tap housing. This flat slide valve has two bores the ascending passages of which in the interior of the handle shank are alike. These ascending passages lead into a common valve seat for a cone on a spindle which can be turned or screwed by means of handle knob located on the end of the shank projecting from the tap housing. A passage in the handle shank leads from the chamber accommodating the valve cone to the water outlet from the tap housing. By turning the spindle in one or the other direction the water passage through the tap is either opened or closed, while by turning the shank and consequently the flat slide valve formed on the end face thereof, the mixture ratio of hot and cold water is adjusted or the inlet for cold water or that for hot water only is freed.

In the case of the taps equipped with a flat slide valve for setting the mixture ratio of hot and cold water, there is no guarantee that no water from one water inlet does not flow into the other water inlet when different pressures prevail in the feed passages. Such guarantee is, however, very important because in the case of most installations, the pressure in the hot water system is different from the pressure in the cold water system. The packings in transverse direction to the pivot axis of the valve require very precise machining. Moreover the necessary pressure exerted on the closely contacting surfaces is relatively heavy.

According to the invention the slide valve for hot and cold water is in the form of an arc or segment of a cylindrical ring with an outlet for the water in the axial direction in a cylindrical seat having a radial inlet passage for the hot water and a radial inlet passage for the cold water. An elastic diaphragm-like cylindrical sleeve covers the passages in the cylindrical seat and is arranged between the cylindrical seat surface and the slide valve.

As a result absolute guarantee against overflow of water from one feed passage into the other feed passage is assured because, in the event of different pressures, the greater pressure will press the diaphragm sleeve against the mouth where the lower pressure prevails and close this like a checkvalve. This guarantee is assured not only when the water passage through the axially shiftable shut-off element is closed but also when the shut-off element is open and a pressure head is formed at the outlet of the valve for example by fitting thereto a spray nozzle control member. Moreover, the parts cooperating for mixing the water can slide one on the other with relatively light pressure with the result that turning is facilitated and wear is reduced. Another advantage is that these parts are in a position parallel to the longitudinal axis of the handle shank which facilitates maintaining the accuracy necessary for perfect operation.

In the construction according to the invention, the cylindrical arc or segment which forms the slide valve is arranged on the end face of the shank located within the tap housing and needs only one ascending passage in the shank extending from this end face. This means a considerable simplification in the manufacture as compared with the tap constructions with two ascending passages, mentioned at the outset.

Yet another advantage of the invention is that the new tap with the same external dimensions allows the passage of a larger quantity of water.

Figure 2:
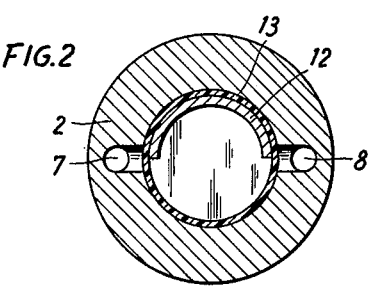

An embodiment of the invention is illustrated by way of example in the accompanying drawing, in which:

FIG. 1 is a vertical section through a tap, and
FIG. 2 is a section taken on line II—II of FIG. 1.

The tap housing is designated by 2. One end of a swivel or rotary shank 1 engages in this housing 2, and is secured therein with the aid of a retaining ring 3 and a pressure ring segment 4, 4a, washers 5 and 6 being provided for packing.

The tap housing 2 has a feed passage 7 for hot water and a feed passage 8 for cold water. The mouth of the passage 7 is located at 9 in a cylindrical seat 11 for a rotary slide valve 12 and that of the passage 8 is located at 10 in the same cylindrical seat 11 diametrically opposite the passage 7. It is obvious that the rotary slide valve 12 need not be arcuate on its inner side. Between the cylindrical seat 11 and the rotary slide valve 12 an elastic diaphragm sleeve 13 in the form of a ring is provided. The rotary slide valve 12 is located on the end face of the shank 1 which, in the embodiment illustrated, also serves for fitting the diaphragm sleeve 13 which consequently turns with the shank. The diaphragm sleeve 13 may, however, also be mounted on the housing 2. The water outlet from the rotary slide valve 12 is designated by 14. It is located in axial direction.

By turning the shank 1, the rotary slide valve or the control segment 12 will be turned with the result that, according to the direction of rotation and the angle through which it is turned, hot water flows out from the mouth 9, hot and cold water simultaneously from the mouths 9 and 10 in the desired quantitative ratio to each other or only cold water from the mouth 10. If, for example, the control segment 12 covers one mouth completely, the outer surface of the rotary slide valve 12 presses the diaphragm sleeve 13 against this mouth and thereby seals it. At the mouth not covered or only partly covered by the rotary sleeve valve 12, the water presses the diaphragm sleeve away from the cylindrical seat so that water can flow through the mouth.

FIG. 2 shows the rotary slide valve 12 in an intermediate position in which both the hot water mouth and the cold water mouth are half open.

Any overpressure on one mouth causes the closing of the mouth by the diaphragm sleeve.

It is evident that the mouths 9 and 10 can also be longer in the peripheral direction of the cylindrical seat than shown in the drawing.

Preceding the rotary slide valve aggregate there is an ascending passage 15 in the shank 1. This ascending passage terminates in a valve seat 16 for a valve cone 17. This latter is mounted on a spindle and, by turning the handle knob 18 on the other end of the shank, can be pressed against the valve seat or raised therefrom. A passage 20 in the shank leads from the shank chamber 19 in which the valve cone 17 is located, to the outlet 21.

In the tap according to the invention, the interior of the rotary slide valve aggregate forms a mixing chamber and the ascending passage 15 a mixing passage.

What I claim is:

1. A mixing valve for mixing hot and cold water having a single valve operating handle, a valve housing including a mixing chamber having an inner wall circular in cross section and having circumferentially spaced hot and cold water inlet canals, said operating handle having a shaft portion extending with its inner end into said valve housing, a valve chamber in the outer end of said operating handle, a single flow canal in said shaft portion communicating with said valve chamber and said mixing chamber, a valve member fixed to said inner end of said shaft portion, said valve member having a segmental arcuate form on its outer periphery for cooperating with said inner wall of said mixing chamber, said segmental arcuate form being greater than the shortest circumferential distance between said inlet canals but less than the sum of said distance and the circumferential extent of both of said inlet canals, and an elastic, hollow, peripherally closed cylinder disposed in said mixing chamber between said valve member and the inner wall of said mixing chamber and covering said inlet canals, the elasticity of said cylinder being sufficient to uncover said canals by inlet pressure when unsupported by said valve member.

2. A valve member according to claim 1 wherein said flexible member is connected to said valve member for movement therewith upon rotation of said valve handle.

References Cited by the Examiner

UNITED STATES PATENTS

| | | | |
|---|---|---|---|
| 1,336,236 | 4/1920 | Johnson | 137—625.41 X |
| 2,214,619 | 9/1940 | Krieger | 137—636.3 |
| 3,064,683 | 11/1962 | Nordstrand | 137—625.42 X |

FOREIGN PATENTS 98,931  11/1961  Norway.

ISADOR WEIL, *Primary Examiner.*